Aug. 31, 1926.
J. J. PALOTCE
MOTOR WRECKING TRUCK
Filed June 9, 1925  3 Sheets-Sheet 2
1,598,220
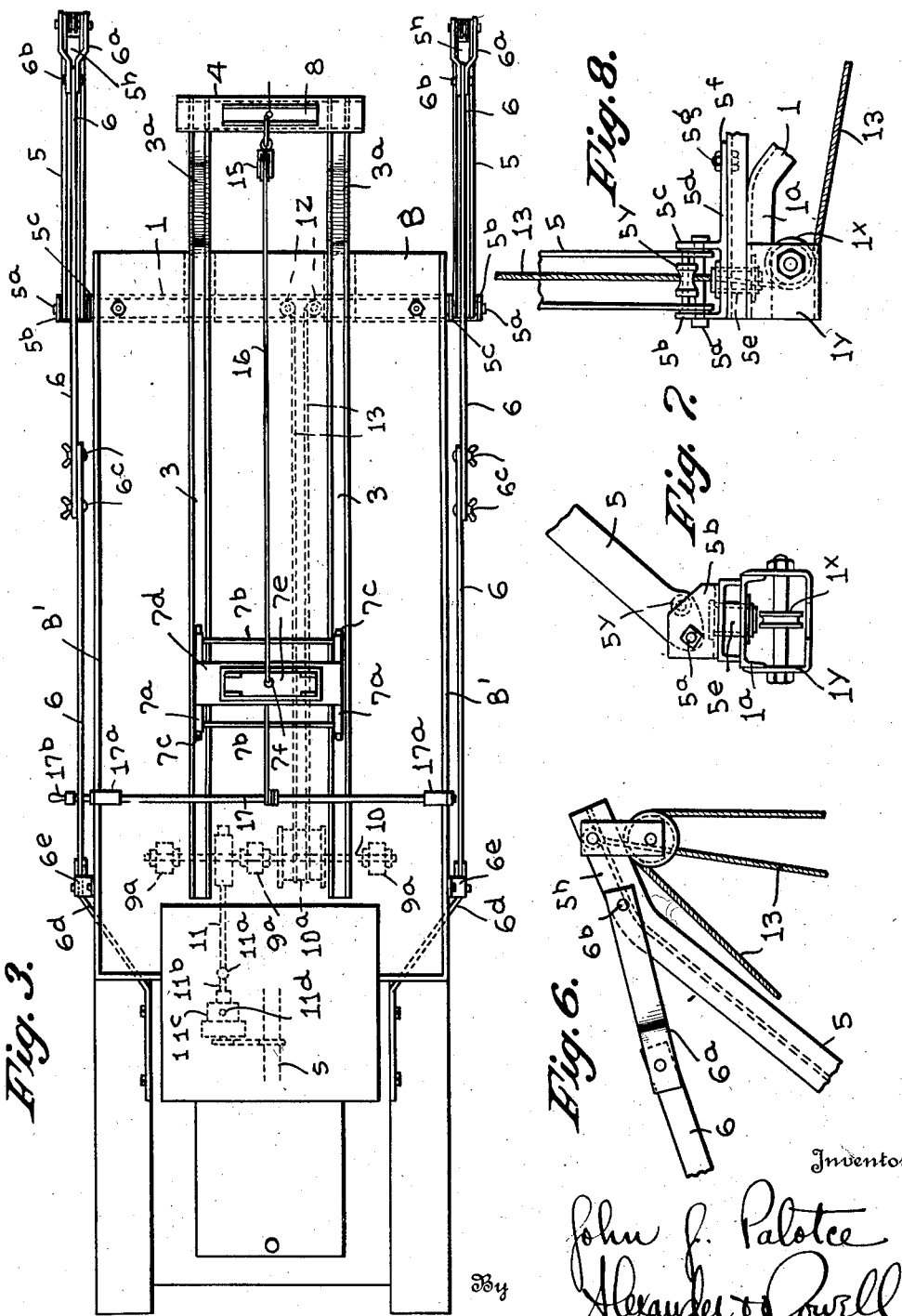

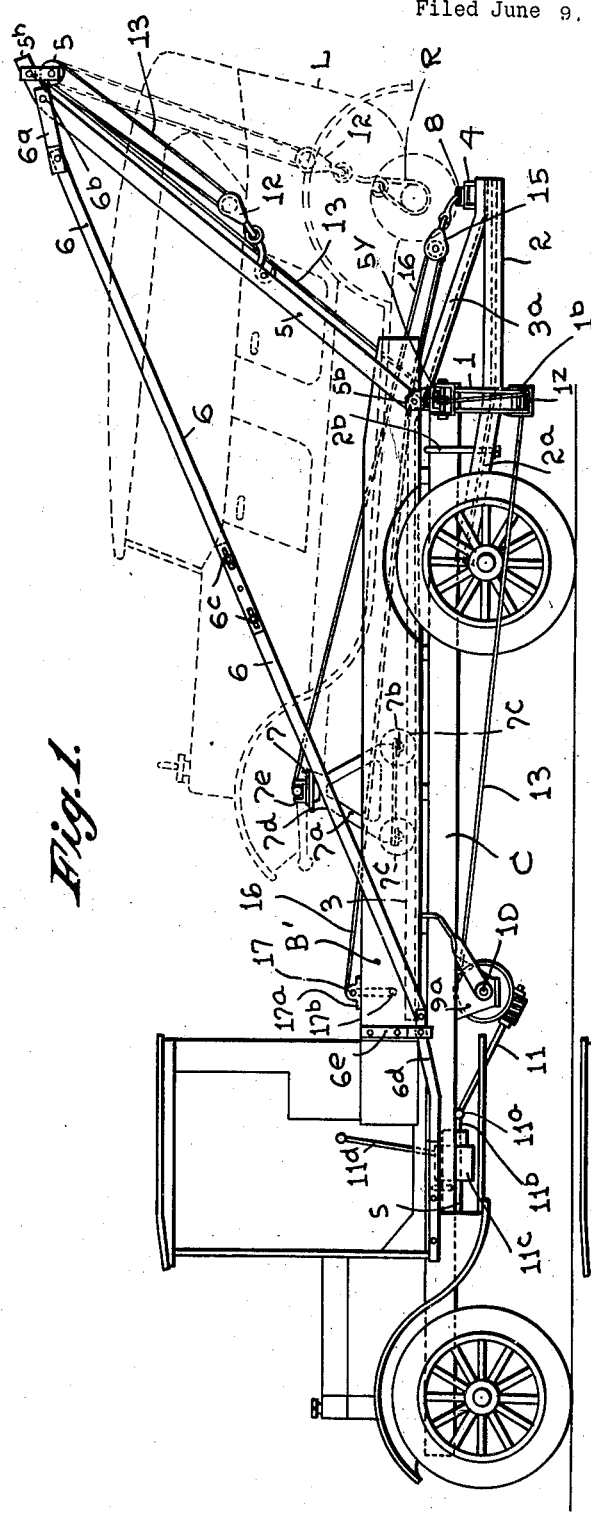

Aug. 31, 1926.

J. J. PALOTCE 1,598,220

MOTOR WRECKING TRUCK

Filed June 9, 1925  3 Sheets-Sheet 3

Patented Aug. 31, 1926.

1,598,220

UNITED STATES PATENT OFFICE.

JOHN J. PALOTCE, OF YOUNGSTOWN, OHIO.

MOTOR WRECKING TRUCK.

Application filed June 9, 1925. Serial No. 35,995.

This invention is a novel improvement in motor wrecking trucks, such as shown in my application Serial No. 732,952, and the principal object thereof is to provide a simple, novel, and efficient wrecking truck which will be capable of readily raising a damaged automobile, or other load, into the body of the truck, and retaining the same therein, and will also be capable of readily removing the same from the truck body and replacing same upon the ground after the truck has been run into a repair shop.

It has heretofore been the practice to mount a single derrick or hoist pivoted to the rear end of a wrecking truck, which hoist is used to raise the front or rear end of a damaged motor vehicle off the ground, the truck then pulling the damaged vehicle into a repair shop. By so pulling the damaged vehicle additional injury thereto is caused by reason of the unusual stresses in the vehicle body. By using my novel wrecking truck, however, the damaged vehicle is hoisted into the body of the truck, and thus transported, without injury, to the repair shop.

I will explain the invention with reference to the accompanying drawings which illustrate one practical embodiment thereof to enable others to adopt and use the same, and will summarize in the claims the novel features of construction, and the novel combinations of parts, for which protection is desired.

In the drawings:

Figure 1 is a side elevation of my motor wrecking truck showing the booms in raised position, and in dotted lines a damaged motor vehicle in the body thereof.

Figure 2 is a view similar to Fig. 1, but showing the booms in folded position along the sides of the truck body.

Figure 3 is a top plan view of the truck shown in Fig. 1.

Figs. 6, 7 and 8 are enlarged detail views.

Figure 4:
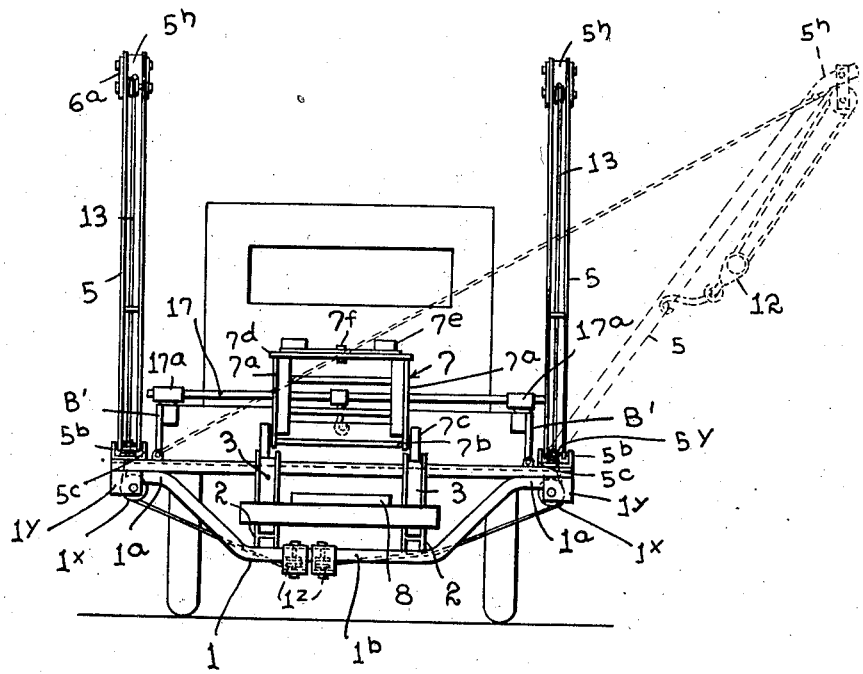
Figure 4 is an end elevation thereof showing in dotted lines the arrangement of braces for the booms when a side-pull is desired.
Figure 5:
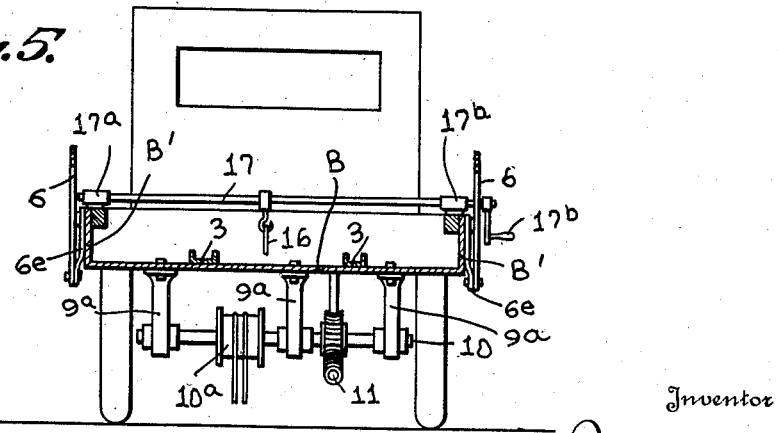
Figure 5 is a transverse section through the truck showing the arrangement of the drum shaft.

As shown, my novel motor wrecking truck preferably comprises a motor vehicle chassis C of any desired type, upon which is mounted an open body B, said body preferably being provided with low side members B'.

The rear transverse member of the chassis C preferably comprises a channel iron 1, having its ends $1^a$ flush with the top of the chassis C and extending beyond the side members B'. The middle portion $1^b$ of member 1 is preferably straight but disposed below the plane of ends $1^a$, whereby the channel member 1 is formed approximately V-shaped. Any other structural shape beam however may be used in place of the channel iron.

Upon the middle portion $1^b$ of channel 1 are mounted, in any desired manner, longitudinal cantilever members 2, preferably H-beams or double channel irons placed back to back, or they may be any other desired structural shape, said members 2 being disposed horizontally, and extending beyond the end of the chassis C. The inner ends $2^a$ of the members 2 are preferably bent slightly upwardly and secured to the chassis C, and are preferably further anchored in position by means of bolts $2^b$ as shown in Figure 1.

Extending longitudinally of the body B, are tracks 3, preferably channel irons, said tracks 3 being preferably disposed directly over the cantilever members 2, and adapted to guide a carriage 7 for supporting the front axle of the damaged vehicle L, or any other load. The outer ends $3^a$ of tracks 3, beyond the body B slope downwardly as at $3^a$ to meet the ends of the cantilever members 2, members 2 and tracks 3 being secured together preferably by means of a transverse member 4 securely bolted or riveted to the ends of members 2 and 3 to hold the outer ends thereof in correct alignment so that the carriage 7 may travel on tracks 3 from the body B down the inclined portions $3^a$ to the outer ends of member 2.

Carriage 7 preferably comprises parallel end frames $7^a$, preferably substantially triangular in shape, provided with axles $7^b$ at the lower corners thereof, bearing wheels $7^c$ adapted to run in tracks 3. The end frames $7^a$ may be connected together by means of frame members $7^d$ securely riveted to the end frames $7^a$, and a saddle $7^e$ is pivoted, as at $7^f$, upon the top of the carriage 7 for the reception of the front axle of a damaged vehicle, the saddle $7^e$ may be adapted to be swung on its pivot $7^f$ into any position in order to receive the axle which may be bent.

The height of carriage 7 should be sufficient to hold the wheels of the vehicle L off the floor of body B.

Upon the top of the member 4 at the outer end of track 3 is pivoted a saddle member 8, preferably a channel iron, adapted to receive the rear axle of the damaged vehicle L when same is carried by the truck, as shown in Figure 1.

At the rear end of the body B, upon each outer end $1^a$ of member 1, is pivoted a boom 5, preferably an I-beam, of suitable dimensions but less in length than the length of the body. The lower end of each boom 5 is pivoted upon a horizontally disposed bolt $5^a$ (Figs. 7 and 8) passing through upstanding lugs or ears $5^b$, $5^c$, of a plate $5^d$, which plate is pivoted upon the ends $1^a$ of member 1 by means of a vertically disposed bolt $5^e$ whereby the booms 5 may be swung into any desired position. Plate $5^d$ is provided with an extension $5^f$ having a perforation at its outer end for the reception of a locking bolt $5^g$ which normally locks plate $5^d$ in such position that boom 5 will swing in a plane parallel with the longitudinal axis of the truck. However, by removing bolt $5^g$, plate $5^d$ may be pivoted on bolt $5^e$ to swing the boom in any angular direction with respect to the axis of the truck.

The upper ends of each boom 5 are preferably bent rearwardly as $5^h$, and a member $6^a$ (preferably Y-shaped) is horizontally pivoted thereto as at $6^b$, member $6^a$ being connected with the upper end of a brace 6 extending downwardly to the front outer corners of the body B.

Each brace 6 is preferably made in two halves of approximately the same length, the adjacent ends of each half having a series of perforations therein adapted to receive pins or bolts $6^c$ whereby the effective length of the brace 6 may be adjusted to hold the boom 5 at any desired elevation. The front end of each brace 6 is pivoted to a strap $6^d$ securely fastened to the chassis C, the rear end of strap $6^d$ being bent outwardly as shown and supported by a hanger $6^e$ fastened to the front outer end of the truck body. When boom 5 is not in use, nut $6^c$ may be removed, disconnecting the halves of brace 6, and the boom 5 swung forwardly into horizontal position in the plane of the truck body as shown in Fig. 2, the halves of brace 6 likewise assuming the same position, whereby boom 5 and its brace 6 will be folded out of the way along the outer side of the truck body.

When it is desired to effect a side-pull, or to raise a load at the side of the truck, boom 5 may be swung as shown in dotted lines in Fig. 4, for a transverse swing by removing locking bolt $5^g$ and turning plate $5^d$ on its pivot $5^e$. Brace 6 may be disconnected from strap $6^d$, and adjusted to desired length, the lower end of brace 6 being engaged with a lug $1^x$ at the opposite side of the body B from the boom.

Depending from the outer ends of booms 5 are blocks 12, said blocks 12 being supported by means of cables 13 having one end tied or otherwise secured to the booms 5, and passing down under the block sheave, and up over pulleys $5^x$ suitably journaled at the ends of said booms. Cables 13 are passed downwardly along the booms and over pulleys $5^y$ suitably journaled at the lower ends of booms 5; also downwardly around pulleys $1^x$ journaled in U-shaped plates $1^y$ mounted below the outer ends $1^a$ of frame member 1. Cables 13 thence pass to pulleys $1^z$ pivoted to the under side of middle portion $1^b$ of frame member 1, and from thence to and around a drum $10^a$ on a shaft 10, whereby as shaft 10 is revolved the blocks 12 will be raised or lowered, the above arrangement of the cables 13 and pulleys permitting the blocks to be simultaneously operated regardless of the position of the booms 5.

Mounted in suitable bearing members $9^a$, depending from the body B of the truck, adjacent the front end thereof, is a shaft 10 disposed transversely of said body. Upon the shaft 10 is mounted a drum $10^a$, in axial alignment with the pulleys $1^z$, upon which the cables 13 wind and unwind.

Shaft 10 is driven by suitable gearing by a shaft 11 Fig. 1 connected through a universal joint $11^a$ to a counter shaft $11^b$, having a clutch $11^c$ interposed therein controlled by means of a clutch lever $11^d$. Counter shaft $11^b$ is driven through suitable gearing or sprockets by the main drive shaft S of the truck, thereby imparting rotation to the shaft 10 when the lever $11^d$ is thrown to engage the members of the clutch $11^c$.

Secured to the outer end of track 3 is a block 15, around which passes a cable 16 having one end secured to carriage 7, as shown in Fig. 1, the other end of cable 16 being wrapped around a shaft 17 suitably journaled in bearings $17^a$ mounted upon the sides B' of the body, said shaft 17 having a crank $17^b$ on one end thereof whereby the shaft may be rotated to wind up the cable 16 thereon, and hence draw the carriage 7 towards the rear end of the track 3 when it is desired to remove the load from the truck.

In operation, when it is desired to hoist a damaged vehicle into the truck body, the wrecking truck is first aligned with the damaged vehicle, and the carriage 7 run out to the end of the track 3 where it will be retained by reason of the inclination of the portions $3^a$ of the track. Booms 5 are then raised to position shown in Fig. 1, and blocks 12 lowered. Slings R may then be passed under the front axle of the damaged vehicle, and engaged with blocks 12, and the shaft 10 rotated raising the blocks 12 simultaneously and lifting the front end of the damaged vehicle into the saddle on carriage 7. Slings R are then removed and passed under the rear axle of the damaged vehicle and again engaged with the blocks 12, which blocks are again simultaneously raised lifting and pulling the vehicle towards the truck, until its rear axle rests in the saddle 8 as shown in Figure 1. As the vehicle is then raised into the truck carriage 7 supporting the front end of the vehicle travels in tracks 3 towards the inner end of the body B. Slings R are preferably retained under the rear axles of the vehicle after seating same in place upon the truck, as a safeguard in case the rear axle of the vehicle should slip out of the saddle 8, and also to hold the vehicle in upright position in the truck saddles. The damaged vehicle thus loaded on the truck may be bodily carried without injury, to a garage or repair shop. When it is desired to remove the vehicle from the truck the above operation is reversed, the carriage 7 being drawn to the rear of the truck by the rotation of shaft 17 by means of crank 17ᵇ, thereby pulling the vehicle back out of the truck.

I do not limit my invention to the exact form shown in the drawing for obviously changes in the details of construction may be made therein within the scope of the claims.

I claim:

1. In combination a vehicle; a plate horizontally swingably mounted on the vehicle; said plate having spaced upstanding lugs thereon; a boom vertically swingably mounted between the lugs on said plate; means for adjusting the elevation of the boom; a lateral extension on said plate; and means on the vehicle engaging the extension for locking the plate in adjusted position.

2. In combination, a vehicle chassis; a body thereon; said chassis extending laterally beyond the sides of the body; plates horizontally swingably mounted on the chassis adjacent the sides of the body; said plates having spaced upstanding lugs thereon; booms vertically swingably mounted at their lower ends between the lugs on the plates; means for adjusting the elevations of the booms; lateral extensions on said plates; and means engaging the extensions for locking the plates to the body in adjusted positions.

3. In combination, a vehicle chassis; a body thereon; a member on the chassis extending beyond the sides of the body; plates horizontally swingably mounted on the member at opposite sides of the body; said plates having spaced upstanding lugs thereon; booms swingably mounted at their lower ends between the lugs on said plates; means for adjusting the elevations of the booms; said plates having lateral extensions provided with perforations; registering perforations in the vehicle body, and bolts engaging said perforations for locking the plates in adjusted positions.

4. In combination, a motor vehicle chassis; an open body thereon; a transverse rear end member on the chassis extending beyond the sides of said body; plates horizontally swingably mounted on the outer ends of the transverse member; said plates having spaced upstanding lugs thereon; booms vertically swingably mounted at their lower ends between the lugs on said plates; said plates being provided with lateral extensions having perforations therein; and means engaging said perforations for locking the plates in adjusted positions.

5. In combination, a motor vehicle chassis; an open body thereon; a transverse rear end member on the chassis; extending beyond the sides of said body; plates horizontally swingably mounted on the transverse member at opposite sides of the body; said plates having spaced upstanding lugs thereon; booms vertically swingably mounted at their lower ends between the lugs on said plates; links supporting the upper ends of the booms; said plates being provided with lateral extensions having perforations therein; means engaging said perforations for locking the plates in adjusted positions; and said links each comprising a plurality of detachably connected sections, whereby when the sections are disconnected said booms and links may be swung down into horizontal position along the sides of the vehicle body.

In testimony that I claim the foregoing as my own, I affix my signature.

JOHN J. PALOTCE.